United States Patent [19]  [11]  4,130,522
McGinniss  [45]  Dec. 19, 1978

[54] AQUEOUS COATING COMPOSITION AND PROCESS

[75] Inventor: Vincent D. McGinniss, Valley City, Ohio

[73] Assignee: SCM Corporation, New York, N.Y.

[21] Appl. No.: 781,660

[22] Filed: Mar. 28, 1977

Related U.S. Application Data

[63] Continuation-in-part of Ser. No. 689,105, May 24, 1976, Pat. No. 4,035,273.

[51] Int. Cl.² .................. C08F 265/06; C08F 273/00; C08F 283/04; C08J 3/06
[52] U.S. Cl. .................... 260/29.2 TN; 260/29.2 EP; 260/29.2 N; 260/29.2 E; 260/29.3; 260/29.4 UA; 260/29.6 HN; 260/29.6 H; 260/837 R; 260/851; 260/857 G; 260/857 UN; 260/859 R; 260/873; 260/885; 526/46; 526/286; 528/360
[58] Field of Search ............... 204/159.18; 260/29.2 R, 260/29.2 EP, 29.2 TN, 29.6 NR, 29.6 HN

[56] References Cited

U.S. PATENT DOCUMENTS

| 3,488,272 | 1/1970 | Frisch et al. | 260/29.2 TN |
|---|---|---|---|
| 3,682,814 | 8/1972 | Gilchrist | 204/181 |
| 3,741,942 | 6/1973 | Crivello | 260/29.2 N |
| 3,853,727 | 12/1974 | Wrzesinski | 204/159.18 |
| 3,853,728 | 12/1974 | Wrzesinski | 204/159.18 |
| 3,925,181 | 12/1975 | McGinniss | 260/29.2 N |
| 4,008,341 | 2/1977 | Kehr | 204/159.22 |

*Primary Examiner*—Murray Tillman
*Assistant Examiner*—Arthur H. Koeckert
*Attorney, Agent, or Firm*—Jerry K. Mueller, Jr.

[57] ABSTRACT

An aqueous coating composition comprises a polymer having pendant mercaptan groups and cross-linking agent having alpha-, beta-ethylenically unsaturated carbonyl groups in aqueous dispersion. In a preferred embodiment, the coating composition serves as a cathodic electrocoating composition.

16 Claims, No Drawings

AQUEOUS COATING COMPOSITION AND PROCESS

CROSS-REFERENCE TO RELATED APPLICATIONS

This application is a continuation-in-part of copending application U.S. Ser. No. 689,105 filed May 24, 1976, now U.S. Pat. No. 4,035,273; and is cross-referenced to the following commonly assigned applications of applicant: U.S. Ser. No. 560,108 filed on Mar. 19, 1975, now U.S. Pat. No. 3,975,251; and U.S. Ser. No. 689,104, now U.S. Pat. No. 4,035,274, and U.S. Ser. No. 689,106, both filed on May 24, 1976. The disclosures of the listed applications are expressly incorporated herein by reference.

BACKGROUND OF THE INVENTION

This invention relates to water-dispersible, heat-curable polymers in aqueous coatings and more particularly to cross-linking mercaptan groups on the polymers with reactive alpha-, beta-ethylenically unsaturated carbonyls.

Applicant's copending application U.S. Ser. No. 689,105 discloses a process for cathodically electrocoating polymers having pendant mercaptan groups and an ethylenically unsaturated carbonyl cross-linker onto a cathode substrate. It now has been discovered that the polymers having mercaptan groups and said cross-linker can form an aqueous coating composition which can be applied to substrates by conventional techniques or by cathodic electrodeposition.

SUMMARY OF THE INVENTION

A curable coating composition in aqueous dispersion for forming a curable film on a substrate, which comprises: a polymer having at least about 5% pendant mercaptan groups, and at least about 5% by weight of said polymer of an alpha-, beta-ethylenically unsaturated carbonyl cross-linking agent having at least two alpha-, beta-ethylenically unsaturated carbonyl groups.

DETAILED DESCRIPTION OF THE INVENTION

The coating composition contains a polymer or resin selected according to final desired use from a wide variety of known polymers in the coating art.

The polymers contain pendant mercaptan groups. Mercaptan groups can be attached to the polymer by esterification of free hydroxyl groups on the polymer (for example, a polyester) with a mercaptan-terminated acid, such as mercaptopropionic acid. Similarly, mercaptan groups can be introduced into the polymer by reacting pendant primary or secondary amine groups on a polymer with a mercaptan-terminated acid or by reacting the free isocyanate group on a mono-isocyanate-terminated polymer with a mercaptan-terminated acid ester having at least two pendant mercaptan groups. Mercaptan groups can be introduced into the polymer by numerous other methods which are well known in the art and as further exemplified in the Examples of this application. The mercaptan groups are pendantly attached to the polymer. For purposes of this application, pendant mercaptan groups include terminal mercaptan groups. By pendantly attached is meant that such mercaptan groups are attached to the polymer chain or to a pendant side chain of the polymer. The polymer containing pendant mercaptan groups should contain at least about 5% by weight of such pendant mercaptan groups, and up to about 50% if desired.

Representative polymers containing pendant mercaptan groups can be derived from epoxy and epoxy-modified diglycidyl ethers of bisphenol A structures, various aliphatic polyethylene or polypropylene glycol (diglycidyl ether) adducts, and glycidyl ethers of phenolic resin, such epoxy resins being commercially available and commonly used in the coatings field. Other useful polymers containing pendant mercaptan groups include polyamide resins, for example, condensation products of dimerized fatty acids coreacted with difunctional amine, such as ethylene diamine, followed by reaction with 3-mercaptopropionic acid. Polyamide resins generally are between about 500 and about 5,000 molecular weight. Further useful coating polymers containing mercaptan groups include acrylic resins having molecular weight of about 1,000 to about 100,000, polyester resins and polyurethane resins both having a molecular weight range of about 500 to about 5,000, vinyl resins, and amine resins. Various other useful polymers containing pendant mercaptan groups can be advantageously employed in the coating composition of this application as will become more apparent in the Examples of this application.

The cross-linking agent is an alpha-, beta-ethylenically unsaturated carbonyl having alpha-, beta-ethylenic unsaturation capable of being reactive to cross-link the mercaptan groups on the polymer. The unsaturated cross-linking agent has at least two pendantly attached alpha-, beta-ethylenically unsaturated carbonyl groups represented by the following general structure:

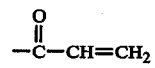

Each unsaturated carbonyl group is pendantly attached to a radical selected from the group consisting of aliphatics, aromatics, aliphatics-aromatics, and polymers having a molecular weight up to about 3,000. Pendantly attached unsaturated carbonyl groups are attached to the radical chain or to a side chain of the radical.

Preferably, the unsaturated carbonyl groups are attached to an oxygen molecule and are represented by the following general structure:

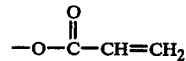

The preferred unsaturated cross-linking agent then is multi-acrylate having at least two pendant acrylate groups. Specific preferred cross-linking agents which are particularly suited to the precepts of this invention can be selected from the group consisting of: ethylene glycol diacrylate, ethylene glycol dimethacrylate, 1,3-butylene glycol dimethacrylate, bisphenol A dimethacrylate, diethylene glycol diacrylate, pentaerythritol triacrylate, pentaerythritol tetraacrylate, trimethylolpropane triacrylate, triethylene glycol dimethacrylate, tetraethylene glycol dimethacrylate, tetraethylene glycol diacrylate, 1,6-hexanedioldiacrylate, melamine acrylate, ethoxylated bisphenol A dimethacrylate, pentaerythritol tetramethacrylate, and polyethylene glycol dimethacrylate.

The preferred unsaturated cross-linking agents can be synthesized by various methods, such as reacting hydroxyl-containing compounds with acrylyl chlorides or methacrylyl chlorides, direct esterification of hydroxyl-containing compounds with ethylmethacrylate, methylmethacrylate and the like. The preferred unsaturated cross-linking agents also can be produced by the transesterification of esters or polyesters with 2-hydroxyethylacrylate, 2-hydroxyethylmethacrylate, hydroxypropylmethacrylate and the like. The preferred unsaturated cross-linking agents can be produced additionally by reacting diisocyanates, polyisocyanates, or isocyanate-terminated polymers and prepolymers with hydroxyl-containing acrylic and methacrylic esters such as, for example, 2-hydroxyethylacrylate or hydroxypropylmethacrylate; by reacting epoxy polymers with acrylic acids or methacrylic acids; and by reacting carboxyl-containing compounds with glycidyl acrylates or glycidyl methacrylates. Further useful unsaturated cross-linking agents include acrylamides, vinyl ketones, and the like.

In practicing this invention, the polymer is rendered water dispersible by conventional techniques such as by adding acid and halogen or alkyl halide, such as, for example, methyl iodide, to the polymer to form a sulfonium ion wherein the sulfonium ion, for example, can be formed from a minor portion of the mercaptan groups or alternatively from available thioether groups in the polymer backbone. The polymer also can contain a minor proportion (generally about 5 weight percent or less) pendant amine groups which solubilize the polymer in the aqueous bath when protonated with a proton-donating acid. The particular method of solubilizing or water dispersing the polymer is not critical to the invention and is accomplished by general techniques well known in the art. Solubilization or water dispersing of the polymer also renders the polymer positively charged so that the polymer can migrate to a cathode substrate and be deposited thereon during electrodeposition use of coating composition. While the polymer is dispersed in the bath, the mercaptan groups will not react with the unsaturated cross-linking agent as the polymer is stable in water.

The water-dispersed polymer is blended with at least about 5% of said unsaturated cross-linking agent by weight of the polymer and up to about 50% if desired. The blend is then dispersed in water to a non-volatiles solids dispersion of about 5% to about 50% and for an electrocoating bath of from about 5 to 20% non-volatiles solids dispersion. The aqueous coating composition is generally at about 60° to about 125° F., with about 70° to about 95° F. being preferred for an electrocoating bath of the coating composition.

The aqueous coating composition can be applied by conventional techniques such as, for example, dipping, rolling, brushing, spraying and the like. In cathodic electrocoating uses of the instant coating composition, a cathode substrate to be electrocoated is immersed in the electrocoating bath while an electric potential is maintained therethrough as disclosed in U.S. Pat. No. 3,619,398, the same being incorporated herein by reference. During electrodeposition the positively charged polymer along with the unsaturated cross-linking agent migrate to the cathode substrate and are codeposited thereon. The electric potential applied to the bath is generally between about 20 and about 500 volts, with about 50 to 300 volts being preferred.

The alpha-, beta-ethylenic unsaturation of the cross-linker is heat reactive under the conditions of curing and readily reacts with the pendant mercaptan groups of the polymer in an addition polymerization reaction. Upon such heating a fully cured coating coats a substrate upon which the composition has been coated.

The coating also can be cured by exposure thereof to ionizing radiation (electron beam curing) as disclosed in U.S. Pat. Nos. 3,501,390 and 3,501,391, the same being incorporated expressly herein by reference.

The coating additionally can be cured with ultraviolet radiation in the presence of an ultraviolet (UV) sensitizer or photosensitizer. The UV sensitizers are combined with the coating composition and can be adapted to be simultaneously co-deposited with the compositon onto a cathode substrate during electrodeposition of the coating composition. The UV sensitizers are added to the coating composition in amounts of at least about 0.5% and preferably between about 1% and 5% by weight of the polymer.

Useful UV sensitizers or photosensitizers include halogenated polynuclear ketones as disclosed in copending Ser. No. 480,738 and U.S. Pat. No. 3,827,957, the same incorporated expressly herein by reference. Other suitable UV sensitizers include organic carbonyl compounds selected from alkylphenones, benzophenones, and tricyclic fused ring compounds as disclosed in U.S. Pat. No. 3,759,807 and incorporated expressly herein by reference. Further useful UV sensitizers include carbonylated phenyl nuclear sulfonyl chlorides such as set forth in U.S. Pat. No. 3,827,959, and expressly incorporated herein by reference. Additional useful photosensitizer combinations particularly suitable for pigmented coatings are a combination of sensitizers comprising aromatic carbonyl compounds, aromatic aldehydes or aromatic ketones, and a synergistic sensitizer of about 0.05% to 3% of 2,2'-dithiobis-(benzothiazole) as more particularly set forth in U.S. Pat. No. 3,847,771, and expressly incorporated herein by reference. At least about 0.5% by weight of ultraviolet sensitizer and preferably about 1% to 5% sensitizer is added to the polymer and thoroughly mixed or otherwise dispersed in the polymer phase prior to solubilizing the polymer in aqueous dispersion. The UV sensitizers additionally can be attached to the polymer backbone for cathodic electrocoating uses such as shown in application U.S. Ser. No. 480,738 filed June 19, 1974, the disclosure of which is expressly incorporated herein by reference.

Typical sources of ultraviolet energy ordinarily produce wavelengths in the ultraviolet spectrum that are transmitted through a quartz and such wavelengths are usually between about 1,600 Å and 4,000 Å. Suitable ultraviolet emittors include various electric arc lamps, plasma arc torch, such as described in U.S. Pat. No. 3,364,387, and lasers having a lasing output in the ultraviolet spectrum as disclosed in copending U.S. Ser. No. 189,154; the disclosures of said references are incorporated expressly herein by reference. Other suitable sources of actinic light include quartz mercury lamps, ultraviolet quartz lamps, and high flash lamps. Details of ultraviolet radiation curing the instant coating composition can be as practiced in copending U.S. Ser. No. 480,738, the disclosure of which is incorporated expressly herein by reference.

The coating composition can contain opacifying pigments and inert extenders such as, for example, titanium dioxide, zinc oxide, clays such as kaolinite clays, silica, talc, and the like. The substrate can be metal, wood, fiber board, or the like. In electrocoating uses of the composition, the cathode substrate is an electrically conductive metal such as iron, steel, aluminum, copper, galvanized steel, zinc, and the like. The cathode substrate can be in the shape of bars, sheets, irregularly shaped forms with rounded or sharp edges, and like shapes.

The following examples show how the instant invention can be practiced, but should not be construed as limiting the invention. In the specification all parts are parts by weight, all percentages are weight percentages, and all temperatures are in degrees Fahrenheit, unless otherwise expressly indicated.

EXAMPLE 1

The electrocoating polymer was prepared by the solution polymerization of one mole of butyl acrylate, one mole of methylmethacrylate, and one-half mole of butylthioethylacrylate (prepared by esterifying butylthioethanol with ethylacrylate) in 2-butoxy ethanol-1 solvent with one mole of thiolacetic acid chain transfer agent. The thiolacetic ester linkages then were hydrolyzed with acid to form pendant mercaptan groups.

The polymer was dispersed in water by the addition of acid and methyl iodide. The water-dispersed electrocoating polymer was blended with 20 grams of triacrylamido-s-triazine cross-linking agent and the blend let down in water to form an aqueous electrocoating bath of 8% non-volatiles solids. The electrocoating composition was cathodically electrodeposited at 100 volts for one minute onto a steel panel immersed in the bath.

The electrocoated panel was removed from the bath, washed with water, and baked at 400° F. for 20 minutes to heat-cure the coating on the panel.

EXAMPLE 2

A hydroxyl-rich polyester was formulated by reacting two moles of succinic anhydride, two moles of propylene glycol and one mole of thiodiethanol. Mercaptan groups were attached to the polyester polymer by the addition of an excess (based on the free hydroxyl content of the polyester polymer) of 3-mercaptopropionic acid thereto. One hundred grams of this mercaptan-terminated polyester polymer was made water dispersible by the addition of methyl iodide. The water-dispersible electrocoating polyester polymer was blended with 30 grams of melamine acrylate cross-linker (2.7 acrylate functionality) and the blend added to water to form an aqueous electrocoating bath of 8% non-volatiles dispersion.

A steel panel was immersed in the bath as the cathode and the electrocoating composition electrodeposited thereon at 60 volts for two minutes. The electrocoated panel was removed from the bath, washed with water, and baked at 360° F. for 15 minutes to fully cure the coating on the panel.

EXAMPLE 3

One mole of DER 664 epoxy resin (Dow Epoxy Resin, epoxy equivalent weight of 900, Dow Chemical Company) was reaced with one mole of nonyl phenol in 2-butoxy ethanol-1 solvent in the presence of 0.5% benzyldimethylamine catalyst followed by a further reaction with the reaction product of one mole of butylthioethanol and one mole of toluenediisocyanate. The product urethane-modified epoxy resin then was reated with one mole of trimethylolpropane tri-(beta-mercaptopropionate) in order to attach pendant mercaptan groups.

The mercaptan-functional, urethane-modified epoxy electrocoating polymer was acidified with acetic acid and one mole of methyl iodide, blended with 30% by weight of pentaerythritoltriacrylate cross-linking agent, and the blend dispersed in water to form an 8% non-volatiles electrocoating bath. The electrocoating composition was cathodically electrodeposited onto a steel cathode panel and the electrodeposited coating heat-cured in a manner as previously described.

EXAMPLE 4

Two moles of toluene diisocyanate were reacted with 0.75 moles of poly(tetramethylene-etherglycol) (molecular weight of 2,000) and 0.25 moles of thiodiethanol followed by further reaction with one mole of propanol to produce a monoisocyanate-terminated urethane resin. This resin was reacted with one mole of the triester of 3-mercaptopropionic acid with trimethylolpropane to produce a mercaptan-functional urethane electrocoating polymer.

One hundred grams of the electrocoating polymer were acidified with acetic acid and 0.25 moles of methyl iodide and blended with 20 grams of triacrylamide-s-triazine cross-linking agent. The blend was added to water to form an electrocoating bath of 8% non-volatile dispersion. A steel panel was cathodically electrocoated with the electrocoating composition (mercaptan-functional urethane electrocoating polymer and cross-linking agent) in a manner similar to that of the previous Examples, the coated substrate washed with water, and baked at 400° F. for 25 minutes. A fully cured coating covered the steel panel.

EXAMPLE 5

An amine-terminated polyamide resin was formulated from two moles of 1,6-hexyldiamine and one mole of adipic acid. Mercaptan groups were attached to the polyamide resin by a further reaction of the resin with two moles of 3-mercaptopropionic acid. One hundred grams of this mercaptan-functional polyamide electrocoating resin were acidified with lactic acid and methyl iodide, blended with 20 grams of pentaerythritoltriacrylate cross-linker, and added to water to form an electrocoating bath of 10% non-volatiles dispersion.

The electrocoating composition comprising the water-dispersed polyamide resin and cross-linker was cathodically electrodeposited onto a steel panel at 100 volts for 1 minute. The coated panel was removed from the bath, washed with water, and baked at 250° F. for 40 minutes. A fully cured coating having no mercaptan odor covered the panel.

EXAMPLE 6

One mole of 1,6-hexanediamine was reacted with one mole of adipic acid to form an amine-terminated polyamide resin. This resin was reacted with one mole of 3-mercaptopropionic acid to form a polyamide resin having both pendant mercaptan and pendant amine groups. The electrocoating polymer was a blend of 50% by weight each of this polyamide resin and the epoxy polymer of Example 7.

A polymer-acrylate cross-linking agent was formulated by reacting two moles of succinic anhydride with one mole of polyoxyethylene glycol (molecular weight of about 1,540), followed by a further reaction with two moles of glycidyl acrylate.

The electrocoating polymer blend was water dispersed in a manner similar to the previous Examples and added with the polyether-polyester-acrylate cross-linking agent to form a 20% non-volatiles aqueous electrocoating bath. The electrocoating composition was cathodically electrodeposited onto a steel panel at 100 volts for two minutes, washed with water, and baked at 400° F. for 35 minutes. A hard, flexible, solvent-resistant coating covered the panel.

EXAMPLE 7

One mole of DER 664 epoxy resin was reacted with one mole of methylethanol followed by further reaction with trimethylolpropane tri-(beta-mercaptopropionate) to produce a mercaptan-functional epoxy resin. This resin was made water dispersible, blended with 10% by weight each of trimethylolpropanetriacrylate and pentaerythritoltriacrylate, and the blend added to water to form an electrocoating bath of 8% non-volatiles dispersion.

The electrocoating composition was cathodically electrodeposited onto a steel panel, removed from the bath, and washed with water. The coated panel then was heated at a sufficiently low temperature (about 150° F.) to effect a flow-out of the coating. The flowed-out panel was subjected to electron beam radiation from an electrocurtain (laboratory model, Energy Sciences, Inc.) under the following conditions: terminal voltage of 150 kilovolts, current of 10 milliamperes, dose of 10 megarad, and linespeed of 10 feet per minute. Upon said electron beam irradiation, a fully cured coating covered the panel.

EXAMPLE 8

To the electrocoating bath of Example 7, ten grams of benzophenone UV sensitizer was added. A steel panel was cathodically electrocoated, and the coating flowed-out in the manner described in Example 7.

The flowed-out panel was exposed for ten seconds to ultraviolet radiation at a distance of three inches from a 3-bulb Ashdee model ultraviolet curing unit, each bulb producing 200 watts per inch on its surface. Upon the ultraviolet irradiation a fully cured coating covered the panel.

EXAMPLE 9

To the electrocoating bath of Example 5 was added 10% benzophenone ultraviolet sensitizer. Cathodic electrodeposition of the electrocoating composition, heat flowing out of the electrodeposited coating, and ultraviolet radiation exposure was performed in the manner described in Example 8 to yield a fully cured coating covering the panel.

EXAMPLE 10

Two moles of toluene diisocyanate were reacted with one mole of poly-(tetramethylene ether glycol) (molecular weight of 2,000) followed by a further reaction with one mole of dimethylethanolamine. This monoisocyanate-terminated urethane resin was reacted with one mole of trimethylolpropane tri-(beta-mercaptopropionate) in order to pendantly attach mercaptan functionality to the urethane resin.

The electrocoating urethane resin was rendered water dispersible blended with the pentaerythritoltetraacrylate cross-linking agent, and added to water to form the electrocoating bath. A steel panel was cathodically electrocoated and the electrodeposited coating heat-cured in a manner similar to that described above.

EXAMPLE 11

An acrylic copolymer was synthesized by the solution polymerization of one mole of butyl acrylate, one mole of diethylaminoethylacrylate, and 1 mole of methylmethacrylate. This copolymer was reacted with the ester of trimethylolpropane with beta-mercaptopropionate to form the electrocoating polymer.

The electrocoating polymer was neutralized with lactic acid, blended with melamine acrylate, and added to water to form the aqueous electrocoating bath. A steel panel was cathodically electrocoated with the electrocoating composition and the coating on the panel heat-cured in a manner similar to that described above.

EXAMPLE 12

Forty grams of the tri-beta-mercaptopropionic acid ester of trimethylolpropane was dispersed in 100 grams of water to which was added 10 grams of methyl iodide and 10 grams of acetone to water-disperse the mercaptan-resin. Then, 27 grams of pentaerythritol triacrylate cross-linking agent was blended with the water-dispersed resin to form the coating composition.

The coating composition was stable in water upon standing in an open container for 2 days at room temperature. The coating composition then was poured into an aluminum cup and air-dried at room temperature for 72 hours to give an elastomeric film having no mercaptan odor.

EXAMPLE 13

To two other substantially identical batches of the water-dispersed resin of Example 12, 27 grams of trimethylolpropane triacrylate cross-linking agent and 27 grams of a water-soluble, acrylate-function aminoplast resin (RF-4470 supplied by Monsanto Chemical Company) cross-linking agent each were blended. Again, these coating compositions displayed the same stability and cure as did the coating composition of Example 12.

EXAMPLE 14

To each of the three coating compositions of Examples 12 and 13 was added a UV sensitizer system of 5 grams benzophenone and 1 gram 2-chlorothioxanthone. Each coating was applied to a steel panel and irradiated with an 800 watt UV curing unit for 1 hour. The result was a fully-cured, tack-free film on each panel.

EXAMPLE 15

To the water-dispersed mercaptan-resin of Example 12 was added a dispersion of 10 grams of diacetoneacrylamide cross-linker in 10 grams of water. This coating composition was placed in an open container, air-dried at room temperature, and baked in an oven for 1 hour at 200° F. This resulted in a fully-cured solid matrix having no mercaptan odor.

What is claimed is:
1. A coating composition in aqueous dispersion for forming a curable film thereof on a substrate comprising:
   (a) a water-solubilized positively charged polymer produced from one having at least about 5% by weight pendant mercaptan groups; and
   (b) at least about 5% by weight of said polymer of an alpha-, beta-ethylenically unsaturated carbonyl cross-linking agent having at least two pendant alpha-, beta-ethylenically unsaturated carbonyl groups,
said cross-linking agent for cross-linking said polymer by addition polymerization upon subsequent curing of said curable film on said substrate.

2. The coating composition of claim 1 wherein said curable film on said substrate cures upon heating.

3. The coating composition of claim 1 wherein said composition contains at least about 0.5% by weight of said polymer of an ultraviolet photosensitizer and said curable film cures upon exposure to ultraviolet radiation.

4. The coating composition of claim 1 wherein said curable film cures upon exposure to ionizing radiation.

5. The coating composition of claim 1 wherein said polymer also has a minor proportion of pendant amine groups which are protonated with proton-donating acid for water solubilizing said polymer.

6. The coating composition of claim 1 wherein said cross-linking agent is an acrylate cross-linking agent having at least two pendant acrylate groups.

7. The coating composition of claim 1 wherein said cross-linking agent is an acrylamide cross-linking agent having at least two pendant acrylamide groups.

8. A cathodic electrocoating composition dispersed in an aqueous electrocoating bath for electrodeposition onto a cathode substrate disposed within said bath for forming a curable electrodeposited coating on said cathode substrate, comprising:
  (a) a water-solubilized positively charged polymer produced from one having at least about 5% by weight pendant mercaptan groups; and
  (b) at least about 5% by weight of said polymer of an alpha-, beta-ethylenically unsaturated carbonyl cross-linking agent having at least two pendant alpha-, beta-ethylenically unsaturated carbonyl groups,
said cross-linking agent for cross-linking said polymer by addition polymerization upon subsequent curing of said curable coating on said cathode substrate.

9. The cathodic electrocoating composition of claim 8 wherein said electrodeposited coating on said cathode substrate cures upon heating.

10. The cathodic electrocoating composition of claim 8 wherein said composition contains at least about 0.5% by weight of said polymer of an ultraviolet photosensitizer and said electrodeposited coating cures upon exposure to ultraviolet radiation.

11. The cathodic electrocoating composition of claim 8 wherein said electrodeposited coating cures upon exposure to ionizing radiation.

12. The cathodic electrocoating composition of claim 8 wherein said electrocoating polymer also has pendant amine groups which are protonated with proton-donating acid for solubilizing said polymer on said aqueous bath, said protonated amine groups adapted to become deprotonated by electrodeposition of said polymer onto said cathode substrate.

13. A cathodic electrocoating composition dispersed in an aqueous electrocoating bath for electrodeposition onto a cathode substrate disposed within said bath for forming a curable electrodeposited coating on said cathode substrate, comprising:
  (a) a water-solubilized positively charged polymer produced from one having at least about 5% by weight pendant mercaptan groups; and
  (b) at least about 5% by weight of said polymer of an acrylate cross-linking agent having at least two pendant acrylate groups; and
said cross-linking agent for cross-linking said polymer by addition polymerization upon subsequent curing of said curable coating on said cathode substrate.

14. A cathodic electrocoating composition dispersed in an aqueous electrocoating bath for electrodeposition onto a cathode substrate diposed within said bath for forming a curable electrodeposited coating on said cathode substrate, comprising:
  (a) a water-solubilized positively charged polymer produced from one having at least about 5% by weight pendant mercaptan groups; and
  (b) at least about 5% by weight of said polymer of an acrylamide cross-linking agent having at least two pendant acrylamide groups; and
said cross-linking agent for cross-linking said polymer by addition polymerization upon subsequent curing of said curable coating on said cathode substrate.

15. The coating composition of claim 1 wherein said polymer contains sulfonium ion groups for water solubilizing said polymer.

16. The cathodic electrocating composition of claim 13 wherein said electrocoating polymer contains sulfonium ion groups for water solubilizing said polymer.

* * * * *